April 3, 1928.	1,664,747
B. KAMENSKY
INTERNAL COMBUSTION ENGINE WITHOUT CARBURETOR
Filed March 31, 1924	3 Sheets-Sheet 2
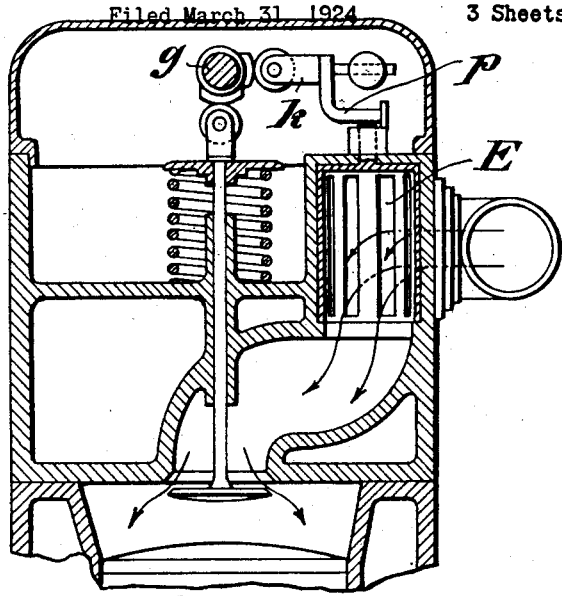
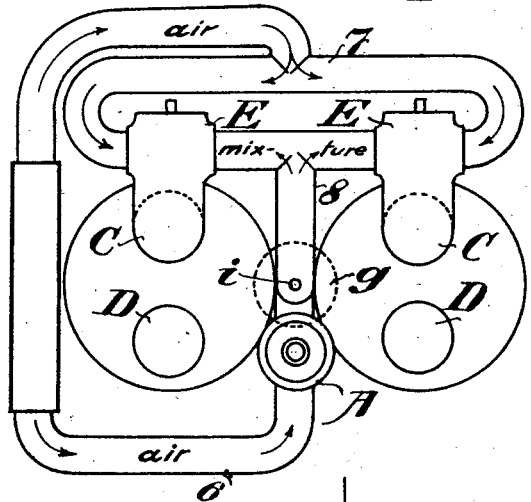
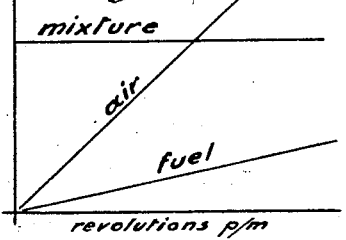
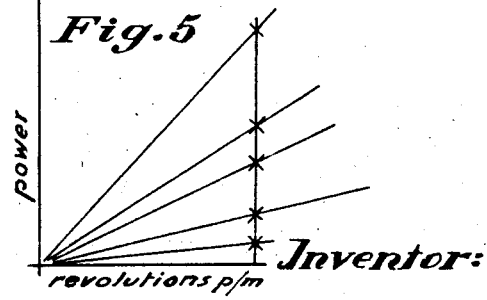

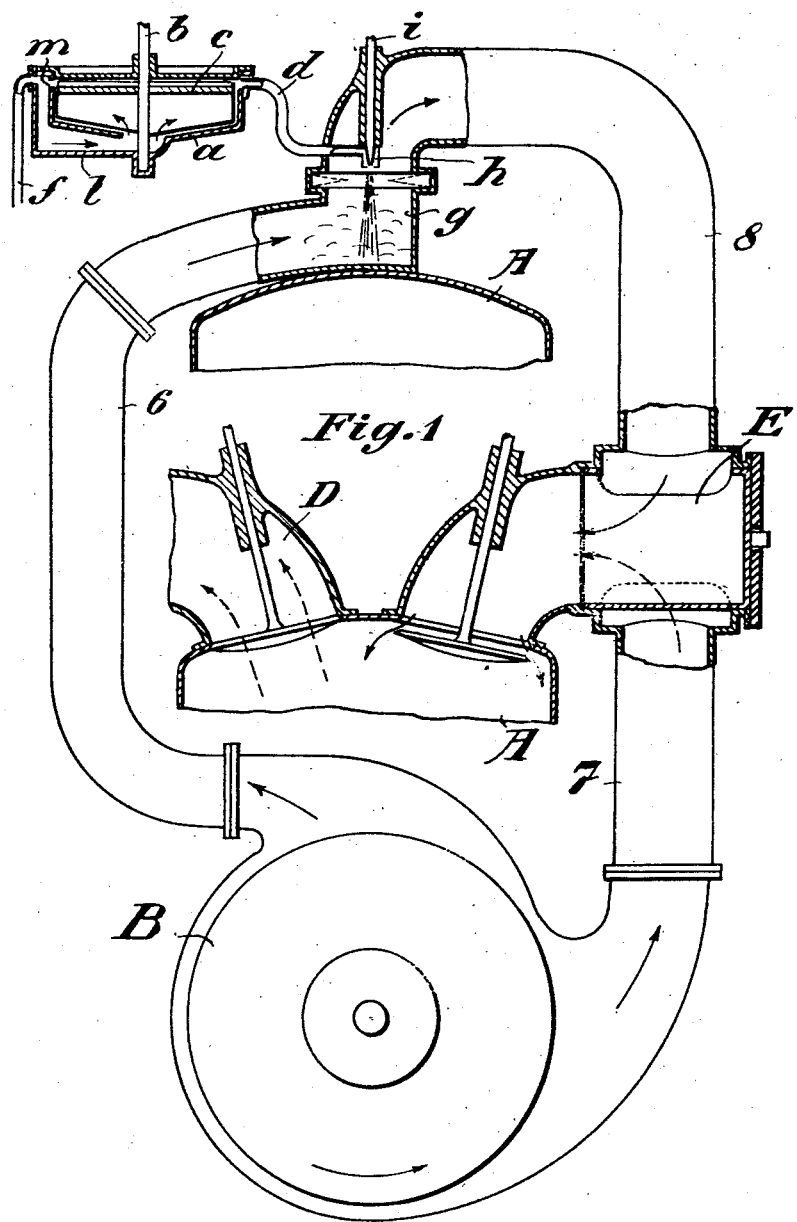

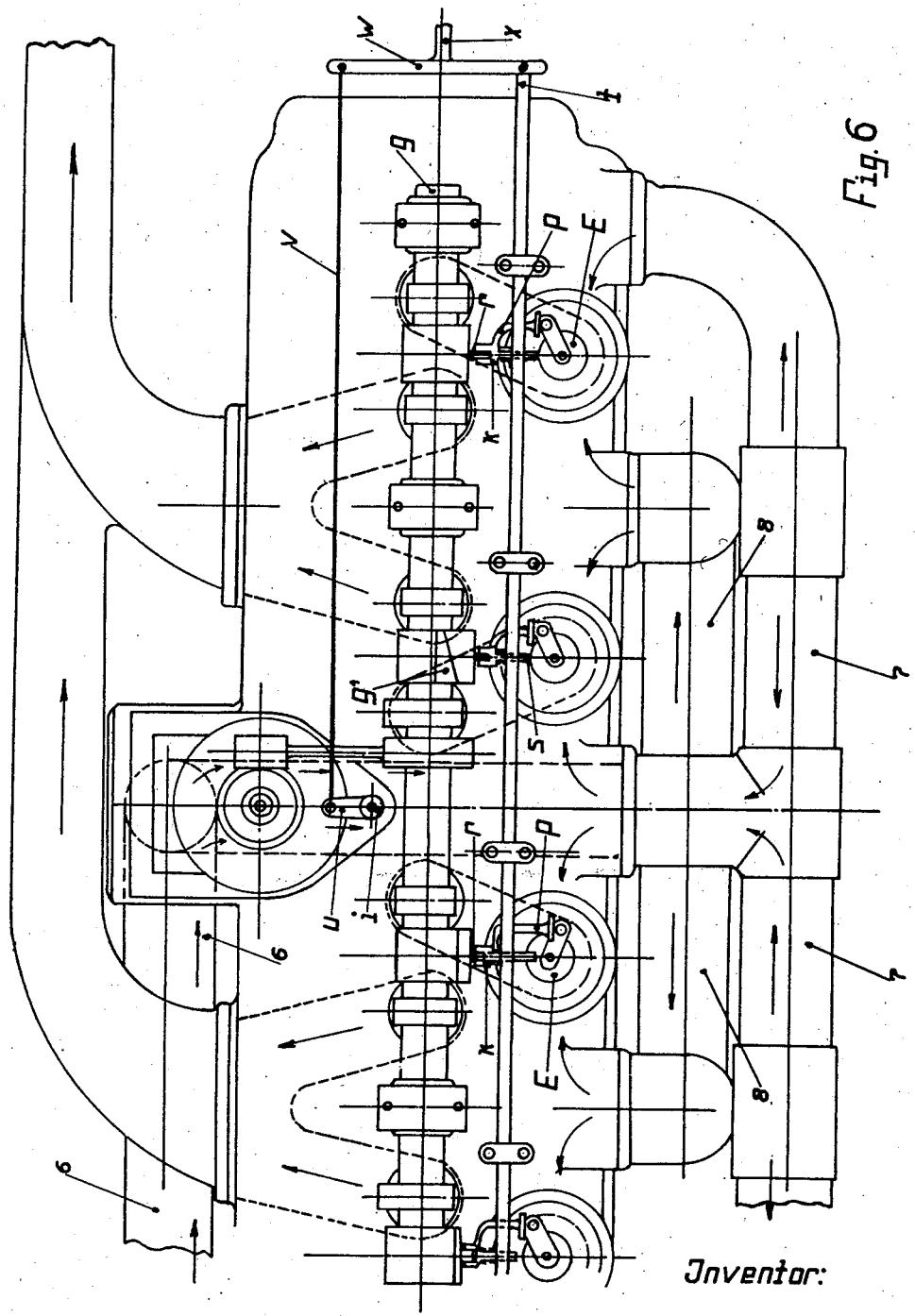

Patented Apr. 3, 1928.

1,664,747

UNITED STATES PATENT OFFICE.

BASILE KAMENSKY, OF BERLIN, GERMANY.

INTERNAL-COMBUSTION ENGINE WITHOUT CARBURETOR.

Application filed March 31, 1924, Serial No. 703,096, and in Germany June 20, 1922.

My invention relates to internal combustion engines or motors and has for its object to avoid any loss in filling the cylinder and to provide improved means for supplying a combustible mixture of hydro-carbon and air to the combustion chamber in the motor.

In the present invention an improved motor is provided not taking in the mixture by suction through a carburetor but receiving it under pressure.

A carburetor is not required at all and a throttle may be dispensed with.

All motors hitherto known are sucking in both the air and the fuel causing the following disadvantages:

(1) The filling of the cylinder is not complete and the losses in power are about 20-25%.

(2) There are various laws of sucking in fuel and air and in the known motors it is impossible to produce a uniform combustible mixture.

(3) The combustion is incomplete. In the present invention means are provided to avoid said disadvantages. The delivery of fuel and air is done under pressure separately. The laws of the delivery of both air and fuel being the same. A uniform mixture is produced at every speed of motor. The cylinders are fully filled under pressure. For the purpose of obtaining good atomization the dosed fuel is evaporated by means of the heat of the combustion. The filling of the cylinder is done separately with pure air and combustible mixture the compression being constant in all speeds and powers.

As the cylinders are fully charged top power of the motor is reached and in comparison with the known motors the present system is gaining 20-25% in power. Super charge is possible.

Higher economy is obtained by increasing the indicated thrust. In the present process a washing out of the combustion chamber takes place.

The invention will be fully described with reference to the accompanying drawings:

Fig. 1 is a schematical view of the whole arrangement,

Fig. 2 a section through the cylinder,

Fig. 3 a schematical upper view of the engine according Fig. 1,

Figs. 4 and 5 are the diagrams illustrating the laws on which the regulating of speed and power is based, Fig. 6 is an upper view of the engine with the distributing means.

In one method of carrying out the invention a vertical spindle paddle wheel fuel dump is used and a centrifugal air pump of the usual type. The fuel pump is preferable to the rotary disc type with the spindle arranged vertically. In order to prevent the whole of the fuel flowing back into the fuel tank when the motor is stopped a small opening $m$ is provided at the side of the pump casing on a level with the top of the fuel inlet which discharges into a receiver or secondary casing open at the lower end of the pump. This small opening is in communication with the atmosphere by means of a passage at the pump spindle the stuffing box being dispensed with so that air will pass into the receiver or secondary casing and thereby prevent the flow of fuel out of the pump into the suction pipe and to the fuel tank. Whilst the motor and the pump are in action a small stream of fuel is flowing constantly through said small opening into the secondary casing a circulation of fuel taking place which has no influence on the action of the pump.

As the fuel pump is not for the purpose of atomizing the fuel and may be a low pressure pump the fuel must be evaporated. The fuel being delivered is projected on the head of the cylinder and there entirely vaporized. For evaporation the combustion heat is used.

The vapours of the fuel are mixed with the pure air flowing through the pipe 6 from the air pump B. The air pump B delivers pure air to the pipes 6—8 and 7 and those may be of any suitable largeness.

The air flowing through the pipes 6—8 takes in the vapour of the dosed fuel and in this manner the combustible mixture is produced. At one side of the valve E there is located mixture and on the other one pure air.

The cylindrical valve E lets separately in pure air and mixture to the cylinder. The valve E performs oscillatory movements and does not close but only turns on air or mixture. The cylinder is separately charged with mixture and pure air. At first there is entering pure air and then mixture. At the end of the exhaust stroke air is flowing into the combustion chamber washing it out. With the beginning of the filling stroke pure air continues flowing into the cylinder in case where not full charge is required. Is full charge of the cylinder required the valve E turns on mixture with the beginning of the filling stroke.

The power of the motor is regulated by the valve E. The valve E is driven by the camshaft G in the same manner as usually valves are driven. The rod p of the valve E may be moved longitudinally so that changing its axial position the valve E turns on mixture sooner or later. The cylinder is thus partly filled with mixture causing the power to be regulated and the other part is pure air. When more power is required the valve E is turned on mixture earlier so that it remains longer open for mixture and more mixture than air may pass through. As the time of admission stays the same more fuel must be delivered by the fuel pump (see the diagram Fig. 5). The opening of the nozzle must be made larger and the needle i lifted up. The longitudinal movement of the rod p is communicated to that of the needle in any suitable manner.

The cam shaft g acts upon the roll r of the lever k and is pressing same against a spring. The distribution valve E is moved by means of the crank lever p. The said crank lever p is connected with the lever k.

The lever k is guided with its extension s in the rod t being longitudinally displaceable. The cams g' of the shaft g are bevelled so that the action upon lever k takes place sooner or later.

The sooner the distribution valve E is turned on mixture the longer the valve E remains opened on mixture and the more mixture may flow in.

The needle i is displaced by means of the lever u and the rod v together with the displacement of the rod t. The connection of the rods t and v is effectuated by means of the traverse w with rod x. For the purpose of displacing the needle i same is located in a screw and is lifted and lowered by turning the lever u.

As the delivery of air and fuel is operated after the same law the combining proportion remains constant in all turns the motor is performing.

The line of the combining proportion forms a parallel to the abscissa (see Fig. 4). The opening of the nozzle h does not change however the number of revolutions may vary (Figs. 4 and 5). But the opening of the nozzle is dependent of the charge. The more the power of the motor is increased the valve E is turning on mixture and the opening of the nozzle h is expanding in width. The more the cylindrical valve E is turning on mixture the more the needle i is shifted too.

At the end of the exhaust stroke the inlet valve C is opened permitting pure air to enter under pressure washing out the combustion chamber. When the exhaust valve D is closed and the suction stroke is beginning, the cylinder is filling with air until the valve E is turning on mixture. When the cylinder is filled and the inlet-valve C is closing the oscillating valve E swings back on pure air so that at the end of the exhaust it is always turned on pure air. The valve E is balanced as there is the same pressure in the pipes 6, 8 as in the pipe 7.

In order to start the motor the passage at the nozzle is shut off by means of a disc with small openings and the motor rotated. The suction produced by the piston causes a considerable vacuum at the nozzle and this will provoke the sucking in of fuel atomization and start the motor. The engine is just as well employable for four stroke as two stroke.

While I have described in detail a particular embodiment of my invention which I have found to be satisfactory and desirable, it will be understood by those skilled in the art that many changes in detail may be made without departure from the spirit of my invention within the scope of the patented claims.

What I claim is:

1. Internal combustion engine comprising in combination with the motor, a regulation valve, air pipes, a motor driven fuel pump admitting dosed quantities of fuel under pressure into the air pipe, means for evaporating the admitted fuel, a motor driven air pump mounted in said air pipes conducting pure air under pressure directly to the regulation valve, both pumps being of the same type.

2. Internal combustion engine comprising in combination with the motor, a regulation valve, air pipes, a motor driven fuel pump admitting dosed quantities of fuel under pressure into the air pipe, means for evaporating the admitted fuel, a motor driven air pump mounted in said air pipes conducting simultaneously on the one hand air under pressure to the evaporating space and thence, admixed with fuel vapours, to the regulation valve and conducting on the other hand pure air under pressure directly to the regulation valve, both pumps being of the same type.

3. Internal combustion engine comprising in combination with the motor, a regulation valve, air pipes, a motor driven fuel pump admitting dosed quantities of fuel under pressure into the air pipe, means for evaporating the admitted fuel, a motor driven air pump mounted in said air pipes conducting simultaneously on the one hand air under pressure to the evaporating space and thence, admixed with the fuel vapours, to the regulation valve and conducting on the other hand pure air under pressure directly to the regulation valve, both pumps being of the same type, a cam shaft, and cams on said shaft controlling the regulation valve.

4. Internal combustion engine comprising in combination with the motor, a regulation valve, air pipes, a motor driven fuel pump admitting dosed quantities of fuel under pressure into the air pipe, means for evaporating the admitted fuel, a motor driven air pump mounted in said air pipes conducting simultaneously on the one hand air under pressure to the evaporating space and thence, admixed with the fuel vapours, to the regulation valve and conducting on the other hand pure air under pressure directly to the regulation valve, both pumps being of the same type, means for always proportionating the separate quantities of air and combustible mixture which entirely fill the cylinder of the motor at every stroke.

In testimony whereof I have affixed my signature.

BASILE KAMENSKY.